UNITED STATES PATENT OFFICE.

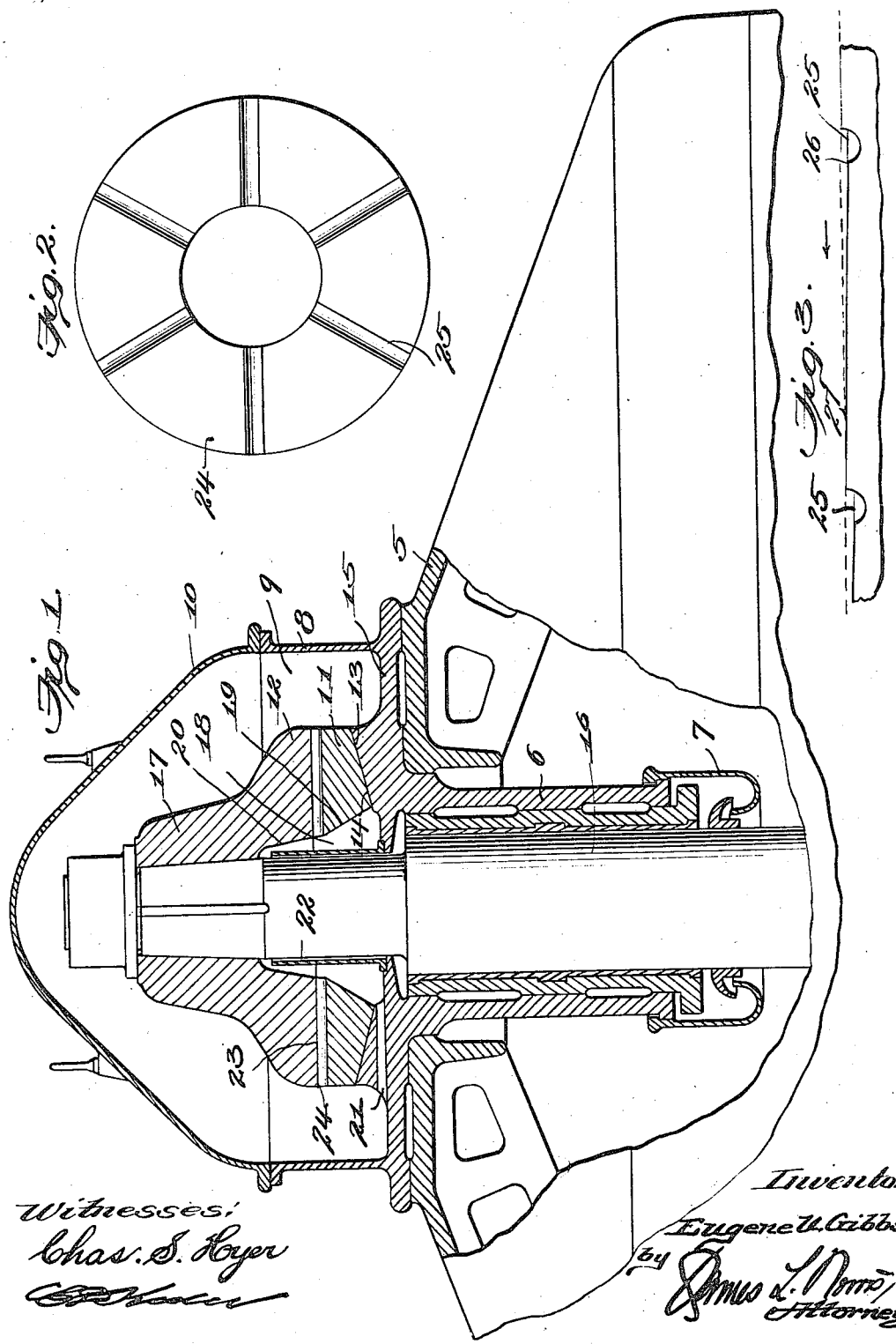

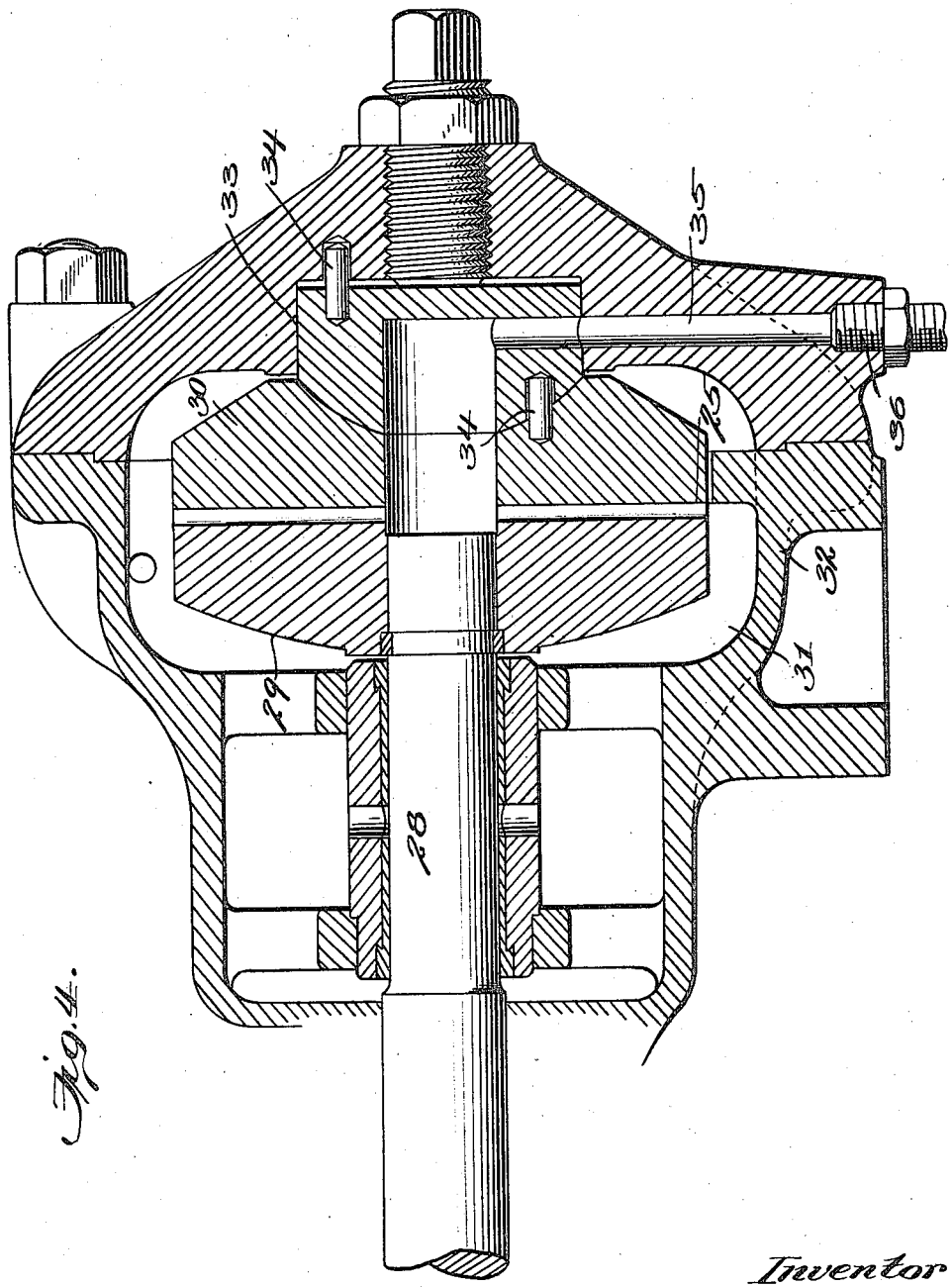

EUGENE U. GIBBS, OF YORK, PENNSYLVANIA.

THRUST-BEARING.

1,153,777. Specification of Letters Patent. Patented Sept. 14, 1915.

Application filed December 3, 1913. Serial No. 804,496.

*To all whom it may concern:*

Be it known that I, EUGENE U. GIBBS, a citizen of the United States, residing at York, in the county of York and State of Pennsylvania, have invented new and useful Improvements in Thrust-Bearings, of which the following is a specification.

This invention relates to thrust bearings for turbine or other shafts embodying a special lubricating structure whereby a more economical and efficient lubrication ensues with material advantages in the operation or the rotation of the shaft and the general operation of a turbine or other mechanism associated therewith. The principle on which this bearing has been devised is that of the wedge. A stationary disk forming part of the bearing relatively to a rotating disk has an inclined face which allows the oil to be drawn or fed in between it and the rotary or revolving disk to build up a thrust pressure between the two disks equal to the total load on the bearing. The adhesion of the oil to the revolving disk causes a pressure, due to the inclined or wedge surface of the stationary disk, to be set up and the oil is drawn or fed regularly between the two disks in an effective film-like form.

The invention consists in the preferred construction and arrangement of the several parts which will be more fully hereinafter described and claimed.

In the drawings: Figure 1 is a sectional elevation of a portion of a turbine mechanism showing the upper bearing for the turbine shaft and sufficient of the general turbine structure to illustrate the practicability of the application of the features of the invention. Fig. 2 is a top plan view of the stationary disk forming part of the bearing. Fig. 3 is a detail side elevation, on an enlarged scale, of a portion of the stationary disk illustrating the inclined face of the stationary disk. Fig. 4 is a longitudinal vertical section of a bearing embodying the same features of construction and disposed in connection with a horizontally arranged turbine shaft.

The improved bearing has been illustrated as applied to a turbine shaft simply for convenience in demonstrating one of its advantageous applications.

The numeral 5 designates a turbine casing or dome having therein a depending bearing member 6 with a lower annular drip cup or oil retainer 7 of well known form, and on the casing 5 an auxiliary casing 8 is disposed to provide an oil chamber 9 having a cap 10 mounted thereover.

The bearing proper comprises a stationary disk 11 and a revolving or rotary disk 12, the stationary disk 11 being disposed on an inclined or wedging seat 13 having a corresponding lower inclined face 14 coöperating therewith, this wedging or inclined seat for the disk 11 insuring a positive placement and mounting of the said disk relatively to the revolving or rotary disk 12 which is disposed thereover, and also providing for an accurate disposition of the said disk 11 by a simple operation. The seat 13 is formed as a part of the bottom 15, and the bearing member 6 also depends from the said bottom. Extending through the member 6 and disks 11 and 12 is a turbine shaft 16, and a collar 17 of the said disk 12 closely engages and is secured to the upper end of said latter shaft. About the portion of the shaft 16 which passes through the disks 11 and 12, an oil circulating chamber 18 is formed by cutting away or boring out the center of the disk 11 and a portion of the center disk 12, as at 19 and 20, the said circulating chamber 18 widening or diverging toward the base of the stationary disk 11. The oil chamber 9 has communication with the lower portion of the circulating chamber 18 through the medium of a port or duct 21 extending through the seat 13, and surrounding the portion of the shaft which would otherwise be exposed in the oil circulating chamber 18 at the centers of the disks 11 and 12 is a fixed guard sleeve 22 which prevents the oil from coming directly in contact with the shaft, and leakage and waste of the the oil is thereby prevented. The bearing face 23 of the rotary disk 12 is smooth or flat and unbroken by indentations or grooves, but the contiguous face 24 of the stationary disk 11 is formed with radial grooves or channels 25 extending fully from the periphery to the center bore of said stationary disk. The segmental portions of the face 24 between the grooves or channels 25 are constructed in inclined planes from a lowermost point 26 adjacent to one side of each groove or channel 25 very gradually to a highest point 27 where all the said portions merge into the horizontal portions of the face 24, and each horizontally straight portion of the latter face continues to the next or succeeding groove or channel 25. This construction is continued regularly throughout the whole face 24. The horizontal portions or flat faces formed as a part of each segment of the face 24 of the stationary disk or member 11 render the thrust obstruction by the bearing effective by providing resisting surfaces that will not be rapidly worn, especially in view of the lubricating material that works thereover, the horizontal portions or flat faces of the segments of the face 24 having direct engagement with the outer portion of the bearing face 23 of the rotary disk 12. If each segmental portion of the face 24 was inclined fully from the edge of one groove 25 to the nearest edge of the succeeding groove 25, the said face would only present a plurality of bearing edges for engagement with the bearing face 23 of the rotary disk 12, and as a consequence wear would rapidly ensue and no positive thrust resisting surfaces would be present. In the form of the bearing shown by Fig. 4, precisely the same principle is involved and almost identically the same structural features, the only difference being in the changes necessary to adapt the bearing to a horizontally disposed shaft 28 to which is attached a rotary disk 29 coöperating with a fixed disk 30, the latter being constructed in all particulars on its bearing face as explained in connection with Figs. 1, 2 and 3, or provided with the grooves 25 with the segmental faces of the bearing surface inclined from one groove to the next groove, as illustrated by Fig. 3. The disks 29 and 30 are located in an oil chamber 31 formed in the casing 32 as shown, and the fixed disk 30 is held on a seat member 33 doweled or otherwise secured as at 34. In the form of the bearing shown by Fig. 4 the inner and outer oil chamber features as disclosed particularly by Fig. 1 are present, the inner oil chamber being partially formed in the seat 33 and also in the center of the disk 30, the seat 33 also serving as a thrust member, and communicating with the inner chamber through the casing and the member 33 is an oil duct 35 having an outer closing plug 36. The remaining features of the structure shown by Fig. 4 are well known in the art of turbine construction and need not be explained in detail, the purpose being to illustrate that the improved bearing may be applied to a vertically disposed shaft, as shown by Fig. 1, or to a horizontally arranged shaft, as shown by Fig. 4.

Referring now particularly to Figs. 1, 2 and 3, it will be understood that the lubricating oil will be placed in the chamber 9 either by removing the cap 10 or by the use of any other well known oil feeding means, and from the chamber 9 the oil will feed to the bearing faces of the disks 11 and 12 and be drawn outwardly in film-like form over the inclined segmental portions of the bearing face of the disk 11 by being taken up from the grooves or channels 25, which are fully open at their opposite extremities, to the chamber 9. As hereinbefore explained, the inclined portions of the face of the stationary disk allow the oil to be drawn or fed between the same and the bearing face of the revolving disk so that a pressure is built up between the two disks equal to the load on the bearing and the oil adheres to the revolving disk and effects a pressure due to the inclined or wedge surface. The oil which passes into the circulating chamber 18 may flow outwardly to the chamber 9 through the port or duct 21, or the oil from the chamber 9 may circulate from the latter back and forth relatively to the chamber 18 or vice versa, and as the guard 22 extends high enough above the level of the oil in the chamber 9 to prevent overflow, there will be no waste of oil due to leakage or direct contact with the portion of the shaft 16 passing through the auxiliary chamber 18. Practically the same operation ensues in the form of the device shown by Fig. 4, but in this instance the two disks 29 and 30 do not have the inner oil circulating chamber owing to the position thereof relatively to the horizontal shaft 28, but in the latter instance the oil enters the grooves or channels 25 and is taken up between the two disks and forced between the inclined or wedge shaped faces of the stationary disk and the fixed flat unbroken face of the revolving or rotary disk. The grooves or channels 25 of the disk 24 and the similar grooves or channels of the disk 29 in the construction shown by Fig. 4 have the same depth throughout their radial extent and provide for a uniform quantity and flow of oil fully from their inner to their outer terminals. This provision is very essential to an equal feeding of the oil from the grooves or channels to the inclined surfaces of the segmental portions of the face 24 between the said grooves or channels, and the outermost portions of the said faces will have the same volume of oil held in the adjacent portions of the grooves or channels for passage over the inclines between the grooves or channels as the remaining parts of the inclines, and hence the film of oil drawn over each inclined portion of the disk face will be of the same thickness at the outer periphery as at the inner periphery of the disk divided into segmental portions by the grooves or channels 25. This uniformity in the feed of oil through the medium of a similar depth of the grooves or channels throughout the lengths of the latter prevents any tendency of the outer portion of the disk being supplied with a less quantity of oil than the inner or intermediate portion of the disk, and, moreover, applicant desires a full circulation of the oil backwardly and forwardly between the chambers 9 and 18, and a similarity of depth of the grooves or channels 25 throughout their full extent is also materially advantageous in encouraging such circulation of the oil and the continual replacement of the oil by a new charge of the same, as it were, on the inclined portions of the face of the disk 24 or the disk 29. In the form of the device shown by Fig. 4 the inner chamber 18, as illustrated by Fig. 1, is lacking and the circulation in the organization as shown by Fig. 4 is effected through the grooves in the disk 29, and it is all the more imperative in the structure shown by Fig. 4 that these grooves be uniform in depth throughout their full extent.

The improved bearing will be found materially advantageous in the operation of turbines, and it will be understood that while the said bearings have been particularly devised for application to turbines they may be used in connection with other mechanisms where found applicable, and to accommodate different applications, changes in the proportions, dimensions and minor details may be resorted to without departing from the spirit of the invention.

What is claimed is:

1. In a bearing of the class specified, the combination of an oil chamber, a shaft extending thereinto, a disk secured to and rotatable with the shaft in the chamber and having a flat unbroken bearing face and a fixed disk in the chamber having a bearing face in close and direct contact with the face of the rotatable disk and formed with radial channels extending from the periphery fully to the center thereof and of equal depth throughout their full extent, the portions of the bearing face of the fixed disk between the radial channels being inclined from a lower point at one side of each channel toward and terminating in a horizontally flat bearing portion in advance of the next succeeding channel throughout the whole surface, the channels of equal depth throughout their extent supplying a uniform quantity of oil to the outermost, innermost and intermediate portions of each inclined part of the bearing face of the rotatable disk and also permitting an unrestricted circulation of the oil from the said oil chamber into and outwardly from the said radial channels.

2. In a bearing of the class specified, the combination of an oil chamber, a shaft extending thereinto, a disk secured to and rotatable with the shaft in the chamber and having a flat unbroken bearing face and a fixed disk in the chamber having a bearing face in close and direct contact with the face of the rotatable disk and formed with radial channels extending from the periphery fully to the center thereof and of equal depth throughout their full extent, the outer portions of the fixed and rotatable disks including the outer extremities of the radial channels of the rotatable disk being fully and unrestrictedly exposed to the oil chamber and the said disks also having their inner portions forming the wall of an inner oil chamber around the shaft to which the inner extremities of the radial channels are also exposed, the portions of the bearing face of the fixed disk between the radial channels being inclined from a lower point at one side of each channel toward and terminating in a flat bearing face in advance of the next succeeding channel throughout the whole surface of the rotatable disk, the equal depth of the radial channels throughout their full extent supplying a uniform quantity of oil to the outermost, innermost and intermediate portions of the inclined and flat portions of the bearing face of the rotatable disk and also permitting an unrestricted circulation of the oil from the outer to the inner oil chambers and vice versa.

In testimony whereof I have hereunto set my hand in presence of two subscribing witnesses.

EUGENE U. GIBBS.

Witnesses:
 SUSAN GIBBS,
 MARGARETTA WILEY.